Aug. 13, 1940.   J. F. DIETRICH   2,211,740
APPARATUS FOR MAKING DRIED PRODUCTS
Filed May 10, 1935   3 Sheets—Sheet 1

Inventor
Julius F. Dietrich

By Sol Shapperio
Attorney

Aug. 13, 1940.   J. F. DIETRICH   2,211,740

APPARATUS FOR MAKING DRIED PRODUCTS

Filed May 10, 1935   3 Sheets-Sheet 3

Inventor
Julius F. Dietrich
By Sol Shapiro
Attorney

Patented Aug. 13, 1940

2,211,740

UNITED STATES PATENT OFFICE 2,211,740

APPARATUS FOR MAKING DRIED PRODUCTS

Julius Ferdinand Dietrich, Chicago, Ill.; Richard H. Dietrich, Sheboygan, Wis., administrator for Julius Ferdinand Dietrich, deceased Application May 10, 1935, Serial No. 20,855

11 Claims. (Cl. 159—5)

This invention relates to machines for producing dried products, particularly those of the milk type.

It is an object of this invention to provide an improved apparatus for the production of dried products.

An important object of this invention is to attain an apparatus capable of producing improved dried products, particularly of the milk type, and such, for example, as are produced from milk and sugar combinations, and of adapting methods of treatment which result in the production of products of unusually fine taste and other characteristics, particularly adapting such products for utilization in fields, such as that of the production of confectionery.

Still further objects and advantages will appear from the more detailed description given below, it being understood, however, that this more detailed description is given by way of illustration and explanation only, and not by way of limitation, since various changes therein may be made by those skilled in the art without departing from the spirit and scope of the present invention.

Figure 1:
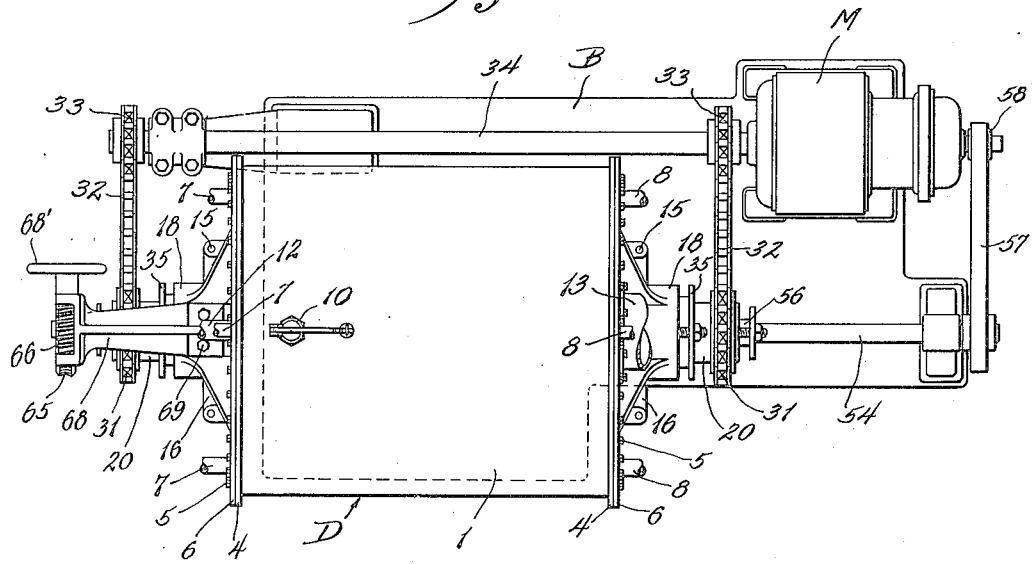
Figure 2:
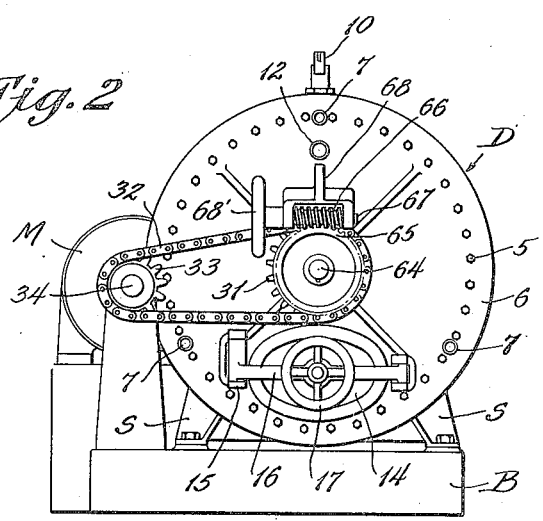
Figure 3:
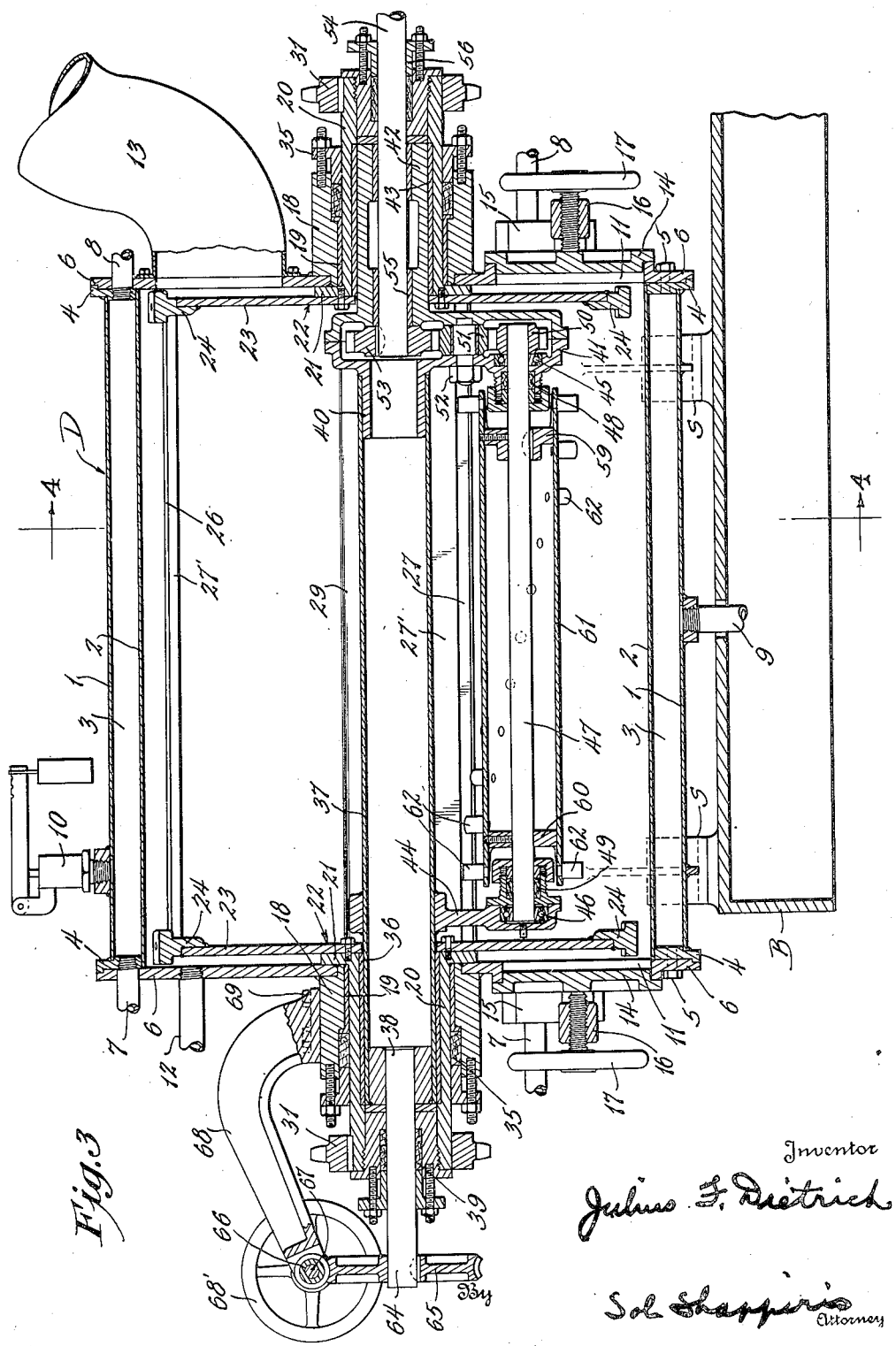
Figure 4:
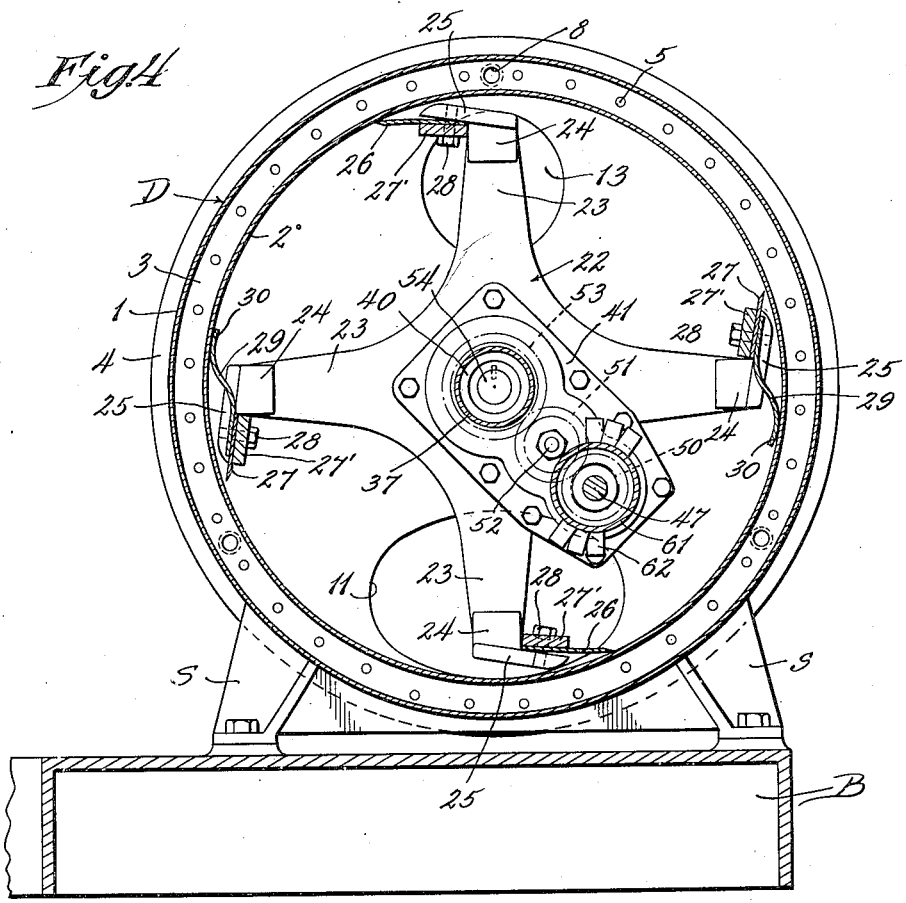
Figure 5:
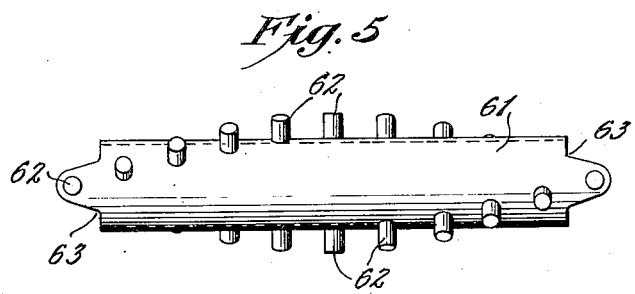
Figure 6:
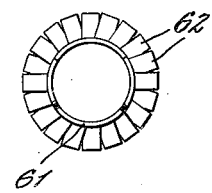
Figure 7:
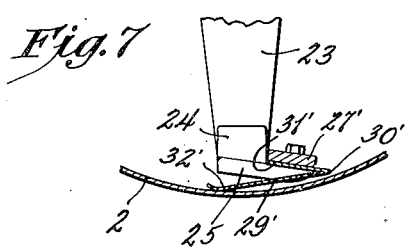

In connection with that more detailed description, there is shown in the accompanying drawings by way of illustration, in Figure 1, a top plan view of the entire machine including operating motors and connections; in Figure 2, an end plan view of the machine shown in Figure 1; in Figure 3, a vertical transverse section of the drier casing and associated elements; in Figure 4, a transverse section through the drier drum or casing taken on the lines 4—4 of Figure 3; in Figure 5, a detail view of the disintegrater element; in Figure 6, an end plan view of the disintegrater of Figure 5; and in Figure 7, a fragmentary detail of a modified scraper element.

In accordance with the present invention, apparatus is supplied for the production of dried milk products, particularly a dried composition obtained from milk and sugar materials.

The means employed and conditions under which such products are produced very materially affect the nature and characteristics of the products obtained from these various standpoints that make the products utilizable in the production of confectionery and similar products. Thus, as exemplary of the temperatures particularly employed, reference may be made to the range of temperatures of from 120 to 140° F.; while a relatively high vacuum is employed, as for example, from 24 to 27 inches of mercury. There is a definite relation between the temperature utilized and the vacuum employed, since the higher the vacuum utilized, the lower is the temperature that is used. While the degree of temperature, preferably kept low, and the degree of vacuum relatively high may be varied, the particular conditions set forth hereinabove enable the production of a very fine type of dried product of valuable characteristics as pointed out above. And these conditions of operation are, therefore, particularly maintained in connection with the machines utilized for carrying out the present invention.

The machine particularly utilized in carrying out the present invention, as illustrated in the drawings, may be said to comprise generally a cylindrical casing or drum D, along the inner wall of which the material under treatment is distributed. Within such drum rotating scraper blades constantly remove the material from the drum's inner surface, while a disintegrater element is employed for constantly renewing the material deposited on the surface of the drum. The maintenance of the operating conditions referred to above, with these particular conditions of treatment by means of the apparatus elements just referred to, enable the product of the present invention to be obtained, particularly when some of the scraper blades are arranged as described below for breaking down the structure of the material, and reducing it to a finer degree, all during the treatment referred to.

In the form of device particularly illustrated in the drawings, the casing or drum D is mounted on standards S, S carried on the base B. The casing D is desirably stationary, and mounted in the standards S against movement. Desirably means are employed for heating the drum or casing D by means of steam or other fluid heat, for which purpose the drum consists of spaced concentric, cylindrical elements 1 and 2, providing a space 3 therebetween through which the steam or other heating medium may circulate. These cylinders 1 and 2 are maintained in their spaced relation by being welded, for example, to the ring 4, which ring is in turn bolted, as shown at 5, to the ends or heads 6 of the casing. Any means, such as pipes 7, may be utilized for introducing the heating element, such as steam, and pipe 8 for removal thereof, any condensate being removable through a drain pipe 9. A safety valve 10 may also be utilized.

An opening 11 is provided in each head 6 of the casing, through which openings 11, 11 the material may be introduced and removed after treatment or the pipe 12 may serve as an inlet. An exhaust 13 attached to an opening in the upper portion of one of the heads 6 serves to remove the vapors withdrawn from the material under treatment, and leads to the usual vacuum pump, not shown. The openings 11, 11 are desirably closed by doors 14 mounted at 15 for swinging movements, with means as shown at 16 for locking the doors securely in position through the hand wheel 17.

The casing heads 6, 6 are provided with relatively large, hollow hub portions 18, 18, respectively, which hub portions serve as housings for sleeve bearings, tubular drive shafts, etc. Thus the hub portions 18, 18, provided with bearings 19, 19, contain the tubular drive shafts 20, 20, by which the motion is transmitted to the scraper arms. Thus each drive shaft 20 at its inner end is provided with a flange 21 to which is secured a spider 22, provided, as illustrated, with four scraper arms 23. Desirably four scraper arms as shown in the drawings, particularly Figure 4, are utilized in connection with the present invention, although any other number of scraper arms may be employed. Each scraper arm 23 at its outer end carries a foot portion 24 having an elongated portion 25, on which the scraper blades 26 are mounted by means of the bar 27', a bolt 28 holding the parts in position. While each of the scraper blades 26 may be mounted on each of the arms 23 in this manner, desirably only two of the scraper blades 26, 26 are mounted in this way, and the intervening scraper blades 27, 27 are desirably either somewhat shorter than the scraper blades 26, 26, or the blades 27, 27 are mounted so that they do not engage directly against the surface of the inner cylinder 2, a slight space thus being formed in this way, for purposes hereinafter set forth. Desirably in connection with the scraper arms which carry the blades 27, 27, means are also provided for engaging against the inner surface of the cylinder 2, which means may take the form of a flexed plate 29 held in position by the bolts 28, 28, which hold the blades 27, 27 in position, such flexed plates 29, 29 extending rearwardly of the scraper arms 23, 23 on which they are mounted, and each such flexed plate 29 being formed with an arcuate end portion 30 impinging against the inner surface of the drum cylinder 2 for purposes hereinafter set forth. The blades 26, 26, 27, 27 and the flexed plates 29, 29 are desirably made of spring metal or other flexible material, so that the angularity of the foot portions and the width or length of the several blades enables tension to be applied to the blades 26, 26 to force their leading edges against the inner surface of the cylinder 2. The flexed plates 29, 29 serve as packing members, and are curved as indicated to crush material against the cylinder walls by their trailing action.

The outer ends of the tubular drive shafts 20, 20 carry sprockets 31, 31 keyed thereto, which sprockets may be driven in any desired way, as for example by the chains operating over sprockets 33, 33 mounted on the shaft 34, which desirably, as shown, is the slow speed shaft of a suitable speed reduction motor M. Stuffing boxes 35, 35 may be utilized as indicated.

One of the tubular drive shafts 20 (see the left-hand portion of Figure 3 of the drawings) is provided with a sleeve bearing 36 within which is journalled an inner relatively long, hollow shaft 37, having at its outer end a reduced portion 38 which extends through a stuffing box 39 in the outer end of the tubular shaft 20. The other or inner end of this long, hollow shaft 37 extends to the other side of the casing, and is connected to the inner hub portion 40 on a radial hollow arm 41, which arm 41 is provided with an outer hub portion 42, the latter being journalled in a sleeve bearing 43 carried in the adjacent hub portion 20.

A second radial arm 44 alined with the first arm 41 is also carried on the hollow shaft 37 within the casing or drum on that portion of the shaft 37 furthest removed from the point of attachment of the arm 41. The radial arms 41 and 44 carry suitable bearings 45 and 46 respectively, in which is journalled a shaft 47 carrying a disintegrater cylinder as hereinafter described. Stuffing boxes 48 and 49 respectively close the ends of the shaft 47. The shaft 47 carries a spur gear 50 on one end thereof which meshes with an idler gear 51 mounted within the arm 41 as by means of the bolt 52, the idler gear in turn meshing with the spur gear 53, through which the power is supplied. For this purpose, the spur gear 53 is mounted on the inner end of a drive shaft 54, which drive shaft extends through and is journalled in the outer hub portion 42 of the hollow arm 41 by means of the bearing 55. This drive shaft 54 passes through a stuffing box 56 in the hub portion 20, and is connected at the outer end of the drive shaft 54 by suitable belting or sprocket chains 57 to the high speed shaft 58 of the speed reduction motor M.

The disintegrater shaft 47 carries bosses 59 and 60 keyed thereon, on which is supported the disintegrater or disintegrating cylinder 61, so that rotation of the shaft 47 through the gear train 50, 51, 53 causes rotation of the disintegrater 61. Desirably the disintegrater cylinder is provided with lugs or projections 62, which may, as shown in Figure 5, desirably be arranged in two spiral rows, each row extending from end to end of the cylinder 61, but only half way around it. The ends of the cylinder 61 are desirably cut away as shown at 63 (except where the end teeth or lugs are located) so that through such cutaway portions access is permitted to the stuffing boxes 48, 49 within the cylinder 61.

In view of the fact that the disintegrater 61 is designed to be partially submerged in material undergoing treatment in the drum or casing, where the lugs or teeth 62 may pick up such material and distribute it over the inner surfaces of the cylinder 2, means are desirably provided for varying the height of the disintegrating cylinder 61 above the lower portion of the casing. For this purpose, a shaft 64 constituting the reduced end of the long hollow shaft 37 passes through the stuffing box 39, and is provided on its outer end with a worm wheel 65 keyed on the shaft 64. The worm wheel 65 is in engagement with a worm 66 carried on a shaft 67 journaled in an overhanging bracket 68, the inner end of which bracket is mounted on the hub portion 20 of the cylinder head 6 as by means of the bolt 69. The worm shaft 67 is provided with a hand wheel 68' by means of which the worm wheel may be turned, to adjust the angularity of the arms 41 and 44 carrying the disintegrater 61, and so that the position of the latter with respect to the material being treated in the drum may be varied.

In the modification shown in Figure 7, the scraper arm 23 carries a modified form of packing member 29' in that the blade is V-shaped in cross section to provide a leading edge 30', spaced a short distance from the inner surface of the cylinder 2, one portion of the V 31', being mounted on the foot portion 24 of the scraper arm 23, while the other portion of the V 32' extends rearwardly in a direction opposite to that of the rotation of the scraper arm, and is tensioned against the inner surface of the cylinder 2 to compact the material thereagainst, a single element shaped in this way, thus being utilizable in lieu of the separate blades 27 and packing member 29 as shown in Figure 4.

The operation of the machine will be apparent from the descirption set forth above. The power for driving the scraper blades and associated elements from the motor M through the sprockets 31, 31 on the hub portions 20, 20 of the scraper arms or spiders 22, 22. The power for the disintegrater is supplied through the shaft 54, the gear train 50, 51, 53 to the shaft 47 of the disintegrater 61. By the use of the speed reduction motor M, the desired rotational movements of the disintegrater 61 and of the scraper arms 22 may be regulated, the disintegrater desirably being given a substantially greater rotational speed than that of the scraper arms 22, and this ratio may for the particular purposes of producing the milk-sugar composition be a ratio of 1 to 60 or 8 to 480.

The disintegrater 61 operating at a relatively high rate of speed and being partially submerged in the material being treated in the drum or casing D, picks up the material under treatment and throws it in a spray or dust form against the inner wall of the cylinder 2. The scraper blades 26, 26 serve continuously to remove the material from the inner surface of the cylinder 2, while the blades 27, 27 separated somewhat from the surface of the cylinder 2 tend to loosen the material carried thereon while the packing members 29, 29 break down the material and subdivide it by compression against the wall or surface of the cylinder 2. While the material undergoing treatment is in substantially liquid condition, the disintegrater 61 serves virtually to spray that material over the inner surface of the cylinder 2, and as the drying proceeds, and the material becomes drier and drier, the deposition of material by the disintegrater tends to be more and more of a spray of finely divided semi-solid materials. By means of this mechansm, a more or less combined action, which may be described as a spraying operation due to the action of the disintegrater 61 combined with a drum drying operation, is secured. This double operation and function of the machine of the present invention results under the conditions of use particularly emphasized above, in a product of unique character.

Since during the drying operation, the bed of material undergoing treatment in the casing or drum D decreases materially in height, the provision referred to has been supplied for varying the height of the disintegrating cylinder, since operation of the hand wheel 68' rotates the worm gear 65 through the worm 66, thus causing rotational movement of the reduced end 64 of the shaft 37 carrying the arms 41 and 44, whereby the radial movement of the arms 41 and 44 positions the disintegrater 61 at the desired point.

While the invention has been particularly described in connection with the drying of milk products, and particularly milk and sugar combinations to produce products of unique value, particularly in the confectionery and related fields, the invention is applicable to the drying of other liquids or semi-liquid or pasty materials to convert them into solid or dry condition.

For chocolate and confectionery purposes, it is desirable to have sugar dissolved in the milk, and the composition thus obtained dried, so as to have the components very thoroughly admixed, and also because the sugar helps to hold the milk flavor while going through the drying process.

Prior art methods of drying are such that the dried milk was left more or less fluffy, and because of that condition it gathered moisture from the air, and soon spoiled. By the apparatus of the present invention, there is obtained the benefit of simple, rapid, inexpensive spray drying in vacuum, while at the same time the product is rolled and packed against the drum so firmly that the particles of dry milk and sugar composition do not readily pick up moisture.

The combination of spray drying in vacuum and drum drying simultaneously accordingly results in types of products that are not obtainable in the prior art.

Certain considerations grow out of the speed of the moving parts and the number of scraper arms, etc. that make the disclosed form of device particularly important. The disintegrater should be large enough in diameter so as to give the ends of the lugs or teeth the proper speed, and so that the lugs or teeth do not bury themselves too easily in the mass of product. The length of the lugs or teeth should be short enough as indicated in the drawings, so that they do not pick up too heavy a load through which the motor might become stalled.

Four sets of scraper arms and four scraper bars are desirable, because the product should be scraped off the wall of the drum as often as possible, and yet the arms including the scraper bars should move rather slowly, since when the product is in a mass, the scraper bars carry it or urge it to the disintegrater.

Having thus set forth my invention, I claim:

1. In a machine for drum-drying liquids, a casing adapted to contain a body of liquid to be dried, and a rotatable disintegrater mounted within said casing and including means for depositing the liquid on the inner surface of said casing, the said disintegrator being mounted for variable positioning relative to the surface of the liquid contained within the said drum, and means for removing deposited material from the surface of said casing.

2. In a machine for drying liquids, a casing adapted to maintain a level of liquid to be dried, a rotatable disintegrater mounted within said casing for depositing the liquid material on a drying surface adapted to be heated, and movable means for regulating the position of said disintegrater by moving the same with respect to the level of said liquid to determine the amount of liquid deposited on said surface.

3. A machine for drum-drying a milk product comprising a stationary casing adapted to contain a body of milk product to be dried, means for supplying heat to said casing, a rotatable disintegrator for depositing the milk product on the surface of the casing, means for alternately compacting said deposited milk product on said surface and for removing the deposited product therefrom, and means for regulating the position of said disintegrator with respect to the level of said milk product in said casing to determine the amount of milk product deposited on said surface.

4. A machine for drum-drying a milk product comprising a stationary casing adapted to contain a body of milk product to be dried, means for supplying heat to said casing, a rotatable disintegrater for depositing the milk product on the surface of the casing, and movable means for regulating the position of said disintegrater by moving the same with respect to the level of said milk product in said casing to determine the amount of milk product deposited on said surface.

5. A machine for drying liquids comprising a casing adapted to contain a body of liquid to be dried, means for supplying heat to said casing, a shaft mounted within said casing, radial arms carried on said shaft, a second shaft mounted on said radial arms within said casing, a rotatable disintegrater carried on said second shaft, and means for imparting movement to said disintegrater.

6. A machine for drying liquids comprising a casing adapted to contain a body of liquid to be dried, means for supplying heat to said casing, a shaft mounted within said casing, radial arms carried on said shaft, a second shaft mounted on said radial arms within said casing, means for varying the radial position of the radial arms with respect to the first-mentioned shaft, a rotatable disintegrater carried on said second shaft, and means for imparting movement to said disintegrater.

7. In a machine for drum-drying liquids, a double walled casing adapted to contain a body of liquid to be dried, means for introducing a heating medium between the walls of the casing, a rotatable disintegrater mounted within said casing and including rigid lugs for depositing the liquid on the inner surface of the inner wall of said casing, the said disintegrator being mounted for variable positioning relative to the surface of the liquid contained within the said drum, and means for removing deposited material from the surface of said casing.

8. A machine for drying liquids comprising a casing on the walls of which a liquid is to be dried, means for supplying heat to said casing, a shaft, radial arms carried on said shaft, a second shaft mounted on said radial arms, a rotatable disintegrater carried on said second shaft, and means for imparting movement to said disintegrater, the first mentioned shaft being so mounted with respect to said casing that movement of the disintegrater deposits liquid to be dried on the walls of said casing.

9. The combination comprising a drying drum adapted to contain a body of liquid and adapted to be hermetically closed, means mounted within the said drum for dispersing liquid contained therein into contact with the drying surface of the said drum, and means mounted externally of the said drum for variably positioning the said dispersing means relative to the surface of the body of liquid contained within the said drum.

10. The combination comprising a drying drum adapted to contain a body of liquid, means mounted within the said drum for dispersing liquid contained therein into contact with the drying surface of the said drum, the said dispersing means being mounted for variable positioning relative to the surface of the body of liquid within the said drum.

11. The combination as in claim 3, wherein the means for alternately compacting the product on the casing surface and for removing the disposed product therefrom, comprises unitary means mounted for rotation within the said drum contiguous to its surface.

JULIUS FERDINAND DIETRICH.